Figure 1:
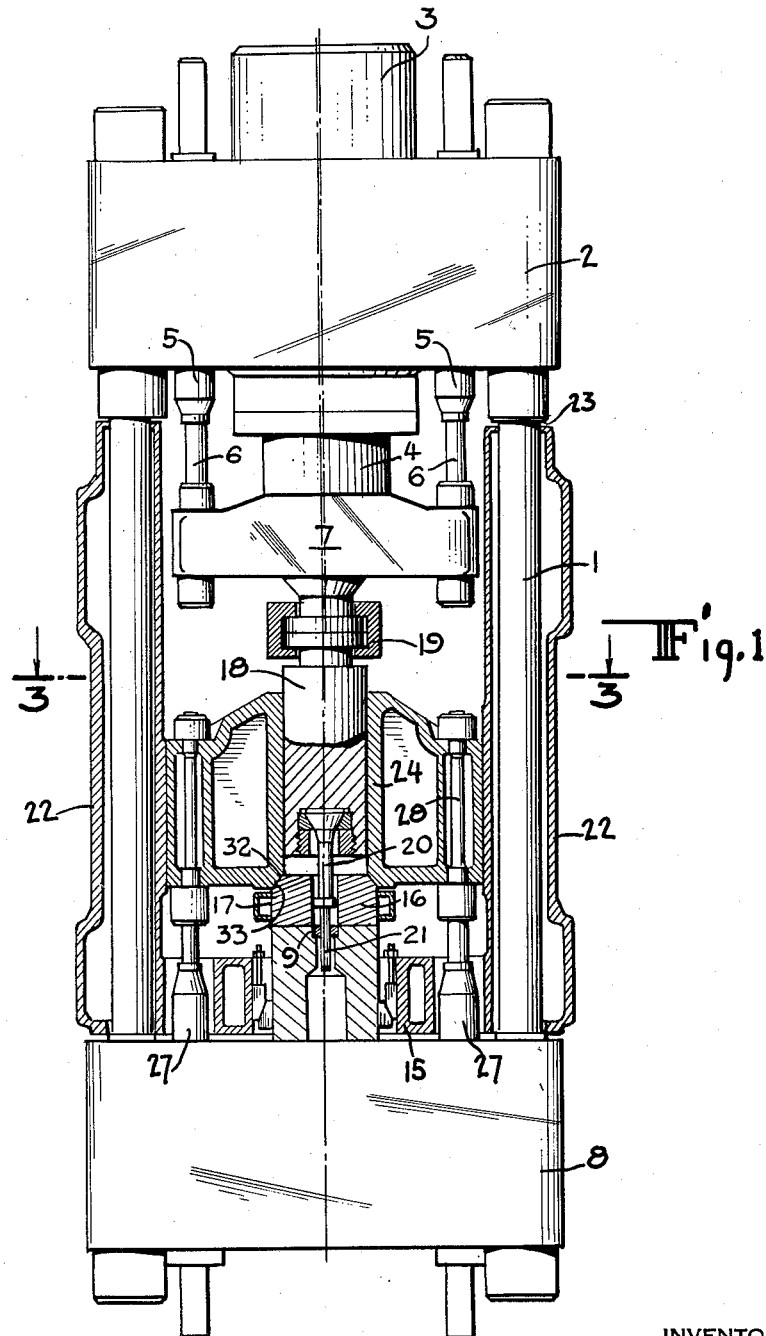

Dec. 12, 1961 P. SINGLETON 3,012,664
METAL EXTRUSION PRESS
Filed Aug. 20, 1958 3 Sheets-Sheet 1

Dec. 12, 1961 P. SINGLETON 3,012,664
METAL EXTRUSION PRESS
Filed Aug. 20, 1958 3 Sheets-Sheet 3

INVENTOR
Peter Singleton
BY
ATTORNEYS

United States Patent Office 3,012,664
Patented Dec. 12, 1961

3,012,664
METAL EXTRUSION PRESS
Peter Singleton, West Moors, England, assignor to The Loewy Engineering Company Limited, Bournemouth, England, a corporation of Great Britain
Filed Aug. 20, 1958, Ser. No. 756,255
Claims priority, application Great Britain Aug. 21, 1957
6 Claims. (Cl. 207—2)

This invention relates to metal extrusion presses and is concerned with presses for extruding either solid or hollow articles. These presses generally comprise reciprocating means consisting of a main cylinder and ram, and a press platen which is maintained in spaced relationship to the cylinder by means of tension-rods or columns. The ram is coupled to a moving crosshead slideable along guideways formed on the press frame, said crosshead being provided with an extrusion stem. An extrusion die is supported on the platen and adjacent this is arranged a billet container which may be displaceable towards or away from the die by means of hydraulic rams. In the case of a press for forming articles of hollow cross-section a mandrel is provided which passes through the extrusion stem.

The aforedescribed arrangement applies to extrusion presses both of the horizontal or vertical type.

During operation of the press, the extrusion force is transmitted in the direction of the press axis from the die onto the platen and from there to the tension-rods or columns and back to the main cylinder. The platen, the tension-rods or columns and the main cylinder form, therefore, together a closed frame structure which absorbs the axial forces to which the press is subjected during its operation. It is an essential requirement for the trouble-free operation of the extrusion press that the extrusion stem should be maintained during its movement relative to the container in concentric relationship with the latter and with the die. The degree to which this requirement is met depends largely on the guideways for the movable crosshead which carries the extrusion stem. It has been found that the conventional arrangement according to which these guideways were formed on the frame was not always satisfactory. This was especially the case with presses which were operated with a mandrel and were required to produce articles with a very high degree of accuracy as regards their cross-section. Difficulties were in particular encountered with cold extrustion presses which apart from being usually required to operate with close tolerances are subject to impacts during the extrusion stroke, causing the press frame to vibrate, in addition to the stress to which the frame is subjected. Finally, in large presses the frame parts on which the guideways were formed had to be spaced apart by a considerable distance and this again was a factor which affected adversely their usefulness.

It is an object of the present invention to obviate the above-mentioned disadvantages and provide an improved metal extrusion press in which a high degree of accuracy is obtained in the alignment of the extrusion stem relative to the container and die.

According to the present invention, a metal extrusion press comprises a longitudinal framework structure provided at one end with reciprocating means and at its opposite end with a pressure platen, said reciprocating means being adapted to move an extrusion stem assembly relative to a container and a die, a hollow guide adapted to receive and center said extrusion stem assembly, said guide and container being centered with respect to each other, and a die mounting structure supported on said pressure platen and centering said die and said hollow guide.

Preferably the extrusion stem assembly includes a stem holder, which latter is received and centered by the hollow guide.

The hollow guide forms, together with the container, a self-contained assembly which ensures a better centering effect than was heretofore possible with the arrangement in which the guideways for the stem were remote from the container. Moreover, with the press according to the invention, guideways for the extrusion stem assembly can be arranged nearer to the axis of the press than heretofore, whereby the degree of accuracy in the alignment of the stem assembly with other press parts is considerably improved.

It is preferred to provide a coupling permitting limited relative movement between the extrusion stem assembly and reciprocating means, so that the assembly, container and die can be centered with respect to each other independently of the reciprocating means.

Preferably the hollow guide is provided with a tapered end portion, adapted to engage a conjugately tapered recess of said container, the arrangement being such that the guide and the container are positively centered with respect to each other when said tapered portion and recess are brought into abutting relationship.

According to a further feature of the invention the hollow guide is mounted for displacement in the axis of the press so that it can move toward or away from the container in order to make room for charging of billets in the container.

Preferably, also, the hollow guide is movable along extensions which project from the die mounting structure, whereby said hollow guide is centered on said structure. The extensions may be in the form of elongated boxes, each encasing a tension-rod or column of the press for part of its length with sufficient clearance to remain free from stresses to which the press is subjected during its operation.

Figure 2:
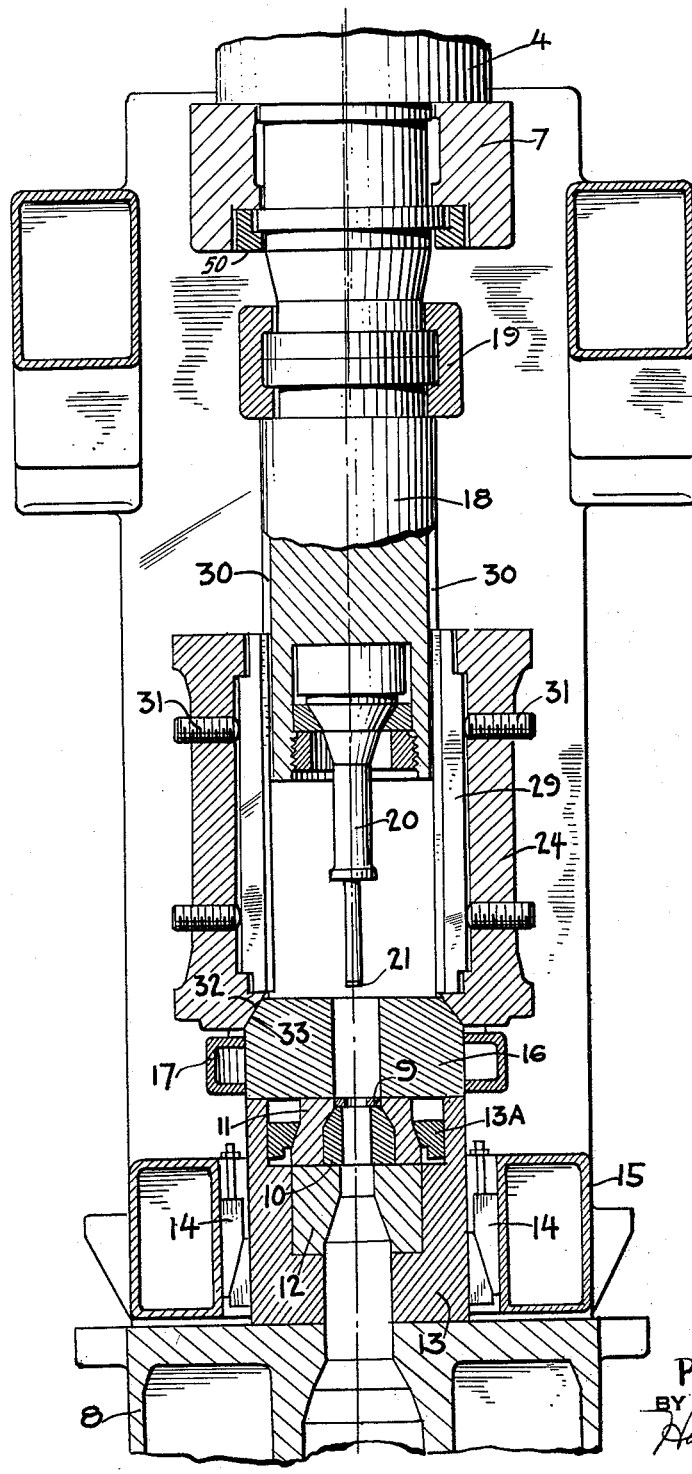
Figure 3:
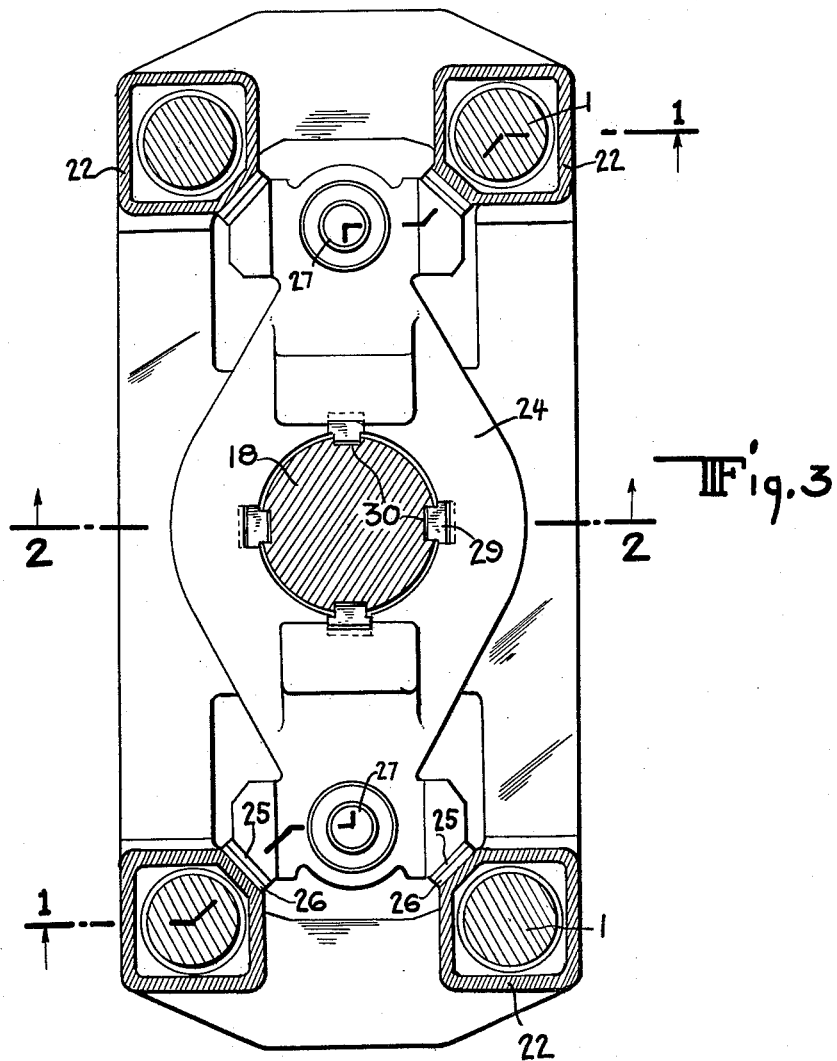

For a better understanding, the invention will now be described by way of example with reference to the accompanying drawings, wherein:

FIGURE 1 is a side elevation partly in cross-section along the line 1—1 of FIGURE 3, of a vertical metal extrusion press constructed in accordance with the present invention, FIGURE 2 is a sectional view of a part of the press to an enlarged scale along the line 2—2 of FIGURE 3, and FIGURE 3 is a horizontal section, also to an enlarged scale along the line 3—3 or FIGURE 1.

As shown, a metal extrusion press comprises four perpendicular tension columns 1 arranged to define the corners of a rectangle which support at their upper ends a cylinder crosshead 2 carrying a main hydraulic cylinder 3 and its associated ram 4, as well as return cylinders 5 and their rams 6 which latter are coupled to a displaceable crosshead 7 carried by the main ram 4. The crosshead 7 is held in position on ram 4 in the normal manner forming no part of the present invention and shown in FIG. 2 whereby the crosshead 7 is held in position by an integral flange on the ram 4 in abutment with a sleeve element 50 which is either directly screwed into or bolted to or otherwise conventionally held in a recess in the crosshead 7. The lower ends of the columns 1 are secured to a pressure platen 8 in a manner well known. The upper surface of the platen 8 supports a die assembly constituted by a die 9 (FIGURE 2) and a backing ring 10 which are both mounted within the bore of a die holder 11 in the manner known. The die holder 11 and backing ring 10 are arranged in abutting relationship with a bolster 12, said holder and bolster 12 being located within bolster carrier 13 and secured therein by means of a locking ring 13A, also in known manner. The bolster carrier 13 is centered by means of adjustable wedges 14 in a die mounting structure 15. For the sake of convenience the die assembly shown in FIGURE 1 is simplified in detail as compared with the enlarged scale view of FIGURE 2.

At least one billet container 16 is arranged for limited longitudinal movement towards and away from the extrusion die 9 by means of hydraulic reciprocating means (not shown) engaging the container holder 17. These reciprocating means may be constituted by cylinder and ram units mounted in the pressure platen or on the main cylinder. For the purpose of facilitating rapid charging of the press and for other reasons to be described hereafter, it is preferable to provide two billet containers operable in sequence. These may be rotatably mounted or adapted for sliding movement into and out of alignment with the main axis of the press. Thus of the two container stations, one is in axial alignment with the main press axis, whilst the other is outside the press for cleaning and recharging thereof.

A plunger having a first portion consisting of an extrusion stem 20 and a second portion which is coaxial with the first portion and consists of a substantially cylindrical stem holder 18 depends from the lower surface of the movable crosshead 7. The plunger is coupled to the ram 4 by means of a loose coupling 19 adapted to permit a limited degree of relative movement between stem holder 18 and the main axis of the main ram 4 so that their axes need not be in alignment. The coupling 19 comprises two flanged half sections which are held together by bolts or other equivalent means. The coupling 19 is movably connected to the flanged ends of ram 4 and of the second portion of the plunger or stem holder 18 to hold together the plunger and the ram when said ram is actuated and to permit transverse movement of the plunger relative to the ram 4, so that the axes of the plunger and of the die assembly are actually concentric during the extrusion operation. FIGS. 1 and 2 portray a situation wherein the axis of ram 4 and the plunger are non-coincident although the axis of the plunger and of the die assembly are coincident, but the flanged abutting ends of the ram 4 and of the second portion of the plunger or stem holder 18 are transversely movable with respect to each other whereby all of said axes may be coincident if other alignment conditions permit. The lower end of the stem holder carries the first portion of the plunger or extrusion stem 20 proper which is coaxial therewith and is provided with a fixed mandrel 21 for the purpose of extruding articles of hollow cross-section. The axis of the plunger is maintained concentric as shown in FIG. 2 with the axis of the die 9, and of the billet container 16, independently of the coincidence or non-coincidence of the axis of the stem holder 18 with the axis of ram 4 by means of a hollow guide 24 described later.

The die-mounting structure 15 is provided with four elongated extensions 22 of substantially square cross-section, each of said extensions encasing an associated tension column 1 and extending over the entire distance between the platen 8 and the cylinder crosshead 2, with the exception of a small gap 23 between the upper ends of the extensions and the cylinder crosshead. As shown in FIG. 1, the lower ends of the extensions 22 rest on a collar which is carried by or is integral with the pressure platen 8 and encircles the lower ends of columns 1. With this arrangement, stresses in the columns 1 are not transmitted to the extensions 22.

A hollow guide 24 is provided with four radial runners 25 each of which engages an associated track 26, formed along the side wall of a corresponding extension 22 facing the press axis. The runners 25 and the tracks 26 maintain the guide 24 centered with regard to the extensions 22 independently of the press frame. The guide is movable in the direction of the press axis by means of double-acting cylinder and ram units 27 coupled to the guide by means of tie-rods 28, the units being supported within the pressure platen 8, as shown.

The second portion of the plunger or stem holder 18 is adapted to slide in an axial direction through the bore of the hollow guide 24 which latter is provided on its inner circumference with a number of longitudinal guide tongues 29. These engage corresponding grooves 30 extending radially into the circumference of the second portion of the plunger or stem holder. Thus rotation of the second portion of the plunger or stem holder 18 relative to the hollow guide 24 is prevented. As shown, see FIG. 2, the guide tongues are provided with screw-threaded adjusting means 31 whereby the clearances between a groove 30 and its associated tongue 29 may be varied as desired. The mouth of the hollow guide is provided with a frusto-conical recess 32, and this is adapted to engage a conjugately tapered portion 33 of the billet container whereby the billet receiving cavity of the latter is brought into axial alignment with a passage through the central guide when the portion 33 is entered into the recess 32, as will later be described. The passage through the bore substantially mates the outside of the second portion of the plunger or stem holder 18. During extrusion operation of the press, the guide 24 which is centered independently of the tension columns 1, but concentric with the billet container 16 and with the die 9, moves the second portion of the plunger or stem holder 18 and the first portion of the plunger or the stem 20 carried thereby transversely with respect to the ram 4 within the coupling 19 to a position wherein the axis of the stem 20 and the stem holder 18 or of the plunger is substantially aligned with the axis of the billet receiving cavity and of the die 9 before the first portion of the plunger or the stem 20 enters therein. The entry of the second portion of the plunger or stem holder 18 into the passage of the guide 24 before the first portion of the plunger or the stem 20 enters the billet receiving cavity causes the requisite movement between the flanged ends of the ram 4 and the second portion of the plunger or stem holder 18 to align the axis of the first portion of the plunger or the stem 20 with that of the billet receiving cavity in the billet container 16 before it enters therein.

At the beginning of an operation the main ram 4 and thereby the stem holder 18 and stem 20 together with the hollow guide 24 are in their raised positions. The press can then be loaded by insertion of a billet into the bore of the billet container 16, the guide being lifted sufficiently from the container to permit the transport of a billet across the space immediately above the container.

In the case of a press being provided with two containers, one container is moved out of the main axis of the press into its recharging position, while the other container is moved in front of the die 9. This has the advantage of permitting charging of the press whilst extrusion is in progress. The guide 24 has then only to be lifted sufficiently to disengage the recess 32 from the tapered portion 33.

Next, the double acting cylinder and ram units 27, which are coupled to the guide 24 by means of tie-rods 28, are operated to move the guide 24 downwardly until the recess 32 is brought into abutting relationship with the tapered portion 33. This has the effect of bringing the container 16 and its bore into co-axial relationship with the guide 24 and consequently with the extrusion stem 20 directed thereby. Since the die 9 and the hollow guide 24 are already maintained in co-axial relationship by means of the die mounting structure 15 and its extensions 22, the extrusion stem 20, the bore of the billet container 16, and the die 9 are all centered and in axial alignment with each other ready for the operation of the press.

It will be appreciated that in the present invention the movable crosshead 7 is not guided anywhere in the press frame and that centering of the container die and stem relative to each other is effected independently of the press frame by centering means including the recessed hollow guide 24 constituting guide means for moving the stem assembly transversely relative to the ram 4, the die mounting structure 15 and its extensions 22. It will also be appreciated that during operation of the press, the degree of accuracy of the alignment occurring between the axis of the extrusion stem 20 and the axis of the billet receiving cavity of the billet container 16 will be determined by the distance between diametrically opposite grooves 30. This distance is far smaller than the distance between the guideways for the movable crosshead of conventional presses, and, even in the case of large presses, alignment between stem, billet container and die can be achieved with a high degree of accuracy.

As previously mentioned, the movable crosshead 7 is connected to the stem holder 18 through the intermediary of the loose coupling 19, so that during operation of the press a limited degree of relative movement between the axes of the stem holder and the main ram 4 is possible.

The invention is not limited to the example described and is applicable to all types of metal extrusion presses, including horizontal as well as to vertical presses, further for hot as well as for cold extrusion, and presses for the extrusion of either solid or hollow articles.

What I claim is:

1. Metal extrusion apparatus comprising: a crosshead; a pressure platen; a plurality of tension rods on which the said crosshead and said platen are mounted in spaced relation to each other; a main hydraulic cylinder and a ram driven thereby, said cylinder being mounted on said crosshead so that said ram may be moved towards and from said platen; a plunger having a first portion which is coaxial with a second portion; said ram and said plunger having facing ends; a means to hold the facing ends of said ram and said plunger in abutting contact while permitting limited transverse movement of the facing end of said plunger with respect to the facing end of said ram; a die having an orifice therethrough which is mounted on said platen in line with a product clearance passage through the latter; a billet container mounted against said die and having a billet receiving cavity which has a cross-section substantially mating the outside of said first portion of said plunger, the axis of said cavity being aligned with that of said orifice; a hollow guide having a passage therethrough substantially mating the outside of said second portion of said plunger, said guide abutting said billet container so that the axis of said passage coincides with the extension of said axis of said cavity; whereby, said second portion is guided and centered in said hollow guide before said first portion enters said billet receiving cavity thus causing the requisite movement between said facing ends which align the axis of said first portion of said plunger with that of said cavity before it enters therein.

2. Metal extrusion apparatus as claimed in claim 1, including means extending through said platen for moving said hollow guide towards and from said billet container and cooperating with said platen; a tongue member carried by said guide, the axis of said tongue member lying in a radial plane through the axis of said passage; said plunger being provided with a groove extending radially into the surface of the second portion of said plunger and wherein said tongue member is engaged.

3. Metal extrusion apparatus comprising: a crosshead; a pressure platen; a plurality of tension rods on which said crosshead and said platen are mounted in spaced relation to each other; a main hydraulic cylinder and a ram driven thereby, said cylinder being mounted on said crosshead so that said ram may be moved towards and from said platen, said ram having a flanged end external to said cylinder; a plunger having a first portion which is coaxial with a second portion, and a flanged end adjacent to said second portion; a coupling which holds the flanged ends of said ram and said plunger in abutting contact but which permits limited transverse movement of the flanged end of said plunger with respect to the flanged end of said ram; a die having an orifice therethrough which is mounted on said platen in line with a product clearance passage through the latter; a billet container mounted against said die and having a billet receiving cavity which has a cross section substantially mating the outside of said first portion of said plunger, the axis of said cavity being aligned with that of said orifice; a hollow guide having a passage therethrough substantially mating the outside of said second portion of said plunger, said guide abutting said billet container so that the axis of said passage coincides with the extension of said axis of said cavity; whereby said second portion is guided and centered in said hollow guide before said first portion enters said billet receiving cavity thus causing the requisite movement between said flanged ends which aligns the axis of said first portion of said plunger with that of said cavity before it enters therein.

4. Metal extrusion apparatus as claimed in claim 3 including means extending through said platen for moving said hollow guide towards and from the said billet container.

5. Metal extrusion press as claimed in claim 4 including a tongue member carried by said guide, the axis of said tongue member lying in a radial plane containing the axis of said passage; said plunger being provided with a groove extending radially into the surface of the second portion of said plunger and wherein said tongue member is engaged.

6. Metal extrusion apparatus as claimed in claim 1, including an auxiliary frame mounted on said platen, die locating means mounted in said auxiliary frame to center the orifice of the die with respect to said auxiliary frame, with the orifice of said die aligned with the product clearance passage through the platen, guide means on said hollow guide engaging guide means on said billet container to adjust the position of said billet container to center the cavity thereof with respect to said auxiliary frame and said die orifice whereby the first portion of said plunger, the cavity in the container and the orifice in said die are centered in said auxiliary frame along a common axis independent of the axis of said ram, and auxiliary hydraulic reciprocating means mounted on said press and coupled to said hollow guide to move said hollow guide toward and away from said billet container.

References Cited in the file of this patent

UNITED STATES PATENTS

| 819,261 | Wood | May 1, 1906 |
| 859,473 | Schlenstedt | May 24, 1932 |
| 1,944,982 | Hoy | Jan. 30, 1934 |
| 2,142,704 | Sparks | Jan. 3, 1939 |
| 2,188,076 | Dinzl | Jan. 23, 1940 |
| 2,778,495 | Krause | Jan. 22, 1957 |

FOREIGN PATENTS

| 542,045 | Germany | Jan. 19, 1932 |